(12) United States Patent
Aoki et al.

(10) Patent No.: US 6,243,220 B1
(45) Date of Patent: Jun. 5, 2001

(54) APPARATUS FOR RECORDING AND REPRODUCING AN AUDIO MODE INFORMATION SIGNAL CORRESPONDING TO AN AUDIO MODE OF A MULTI-CHANNEL AUDIO SIGNAL

(75) Inventors: Akio Aoki, Ohta-ku; Yukio Kamiya, Yokohama; Osamu Itokawa, Akishima, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/732,681

(22) Filed: Oct. 18, 1996

Related U.S. Application Data

(63) Continuation of application No. 08/151,357, filed on Nov. 12, 1993, now abandoned.

(30) Foreign Application Priority Data

Nov. 19, 1992 (JP) .................................................. 4-333535

(51) Int. Cl.$^7$ ...................................................... G11B 5/02
(52) U.S. Cl. .............................. 360/18; 360/27; 360/13
(58) Field of Search ............................... 360/18, 19.1, 48, 360/24, 22, 27; 358/335, 343; 386/54, 56, 96, 97, 98, 99

(56) References Cited

U.S. PATENT DOCUMENTS

| 4,575,772 | * | 3/1986 | Shimada et al. | 360/19.1 |
| 4,947,271 | * | 8/1990 | Nakayama et al. | 360/19.1 |
| 5,003,407 | * | 3/1991 | Nakano et al. | 360/19.1 |
| 5,053,890 | * | 10/1991 | Namiki | 360/19.1 |
| 5,280,394 | * | 1/1994 | Murabayashi et al. | 360/19.1 X |
| 5,396,374 | * | 3/1995 | Kubota et al. | 360/27 |

* cited by examiner

*Primary Examiner*—Andrew L. Sniezek
(74) *Attorney, Agent, or Firm*—Fitzpatrick, Cella, Harper & Scinto

(57) ABSTRACT

In a recording and reproducing apparatus, a plurality of audio signal areas and audio sub-code areas for recording audio mode information of the respective areas are provided on a recording medium in a record mode. The audio mode information corresponding to the audio signal area is detected from the audio signal sub-code in the reproduction mode.

17 Claims, 10 Drawing Sheets

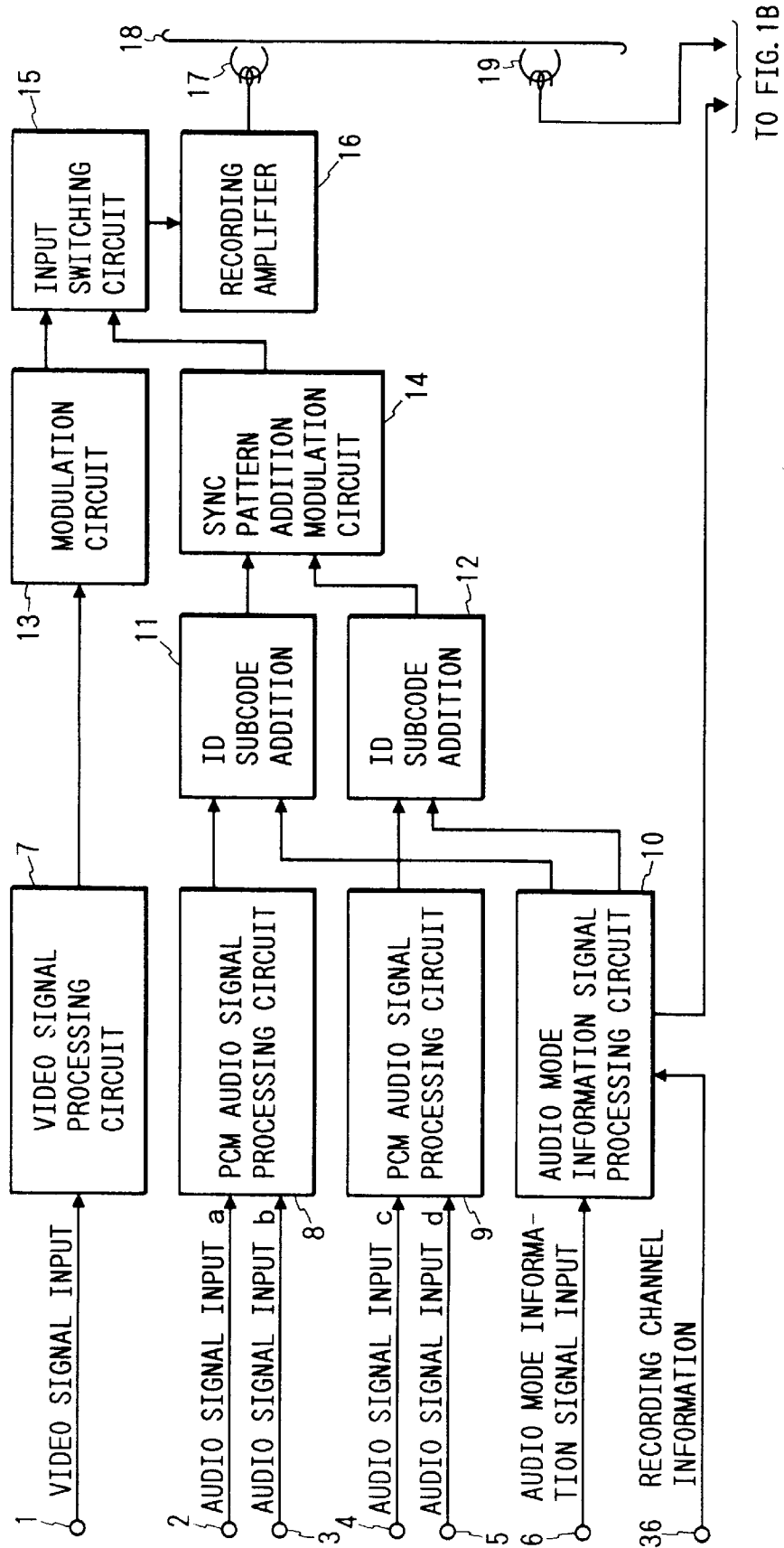

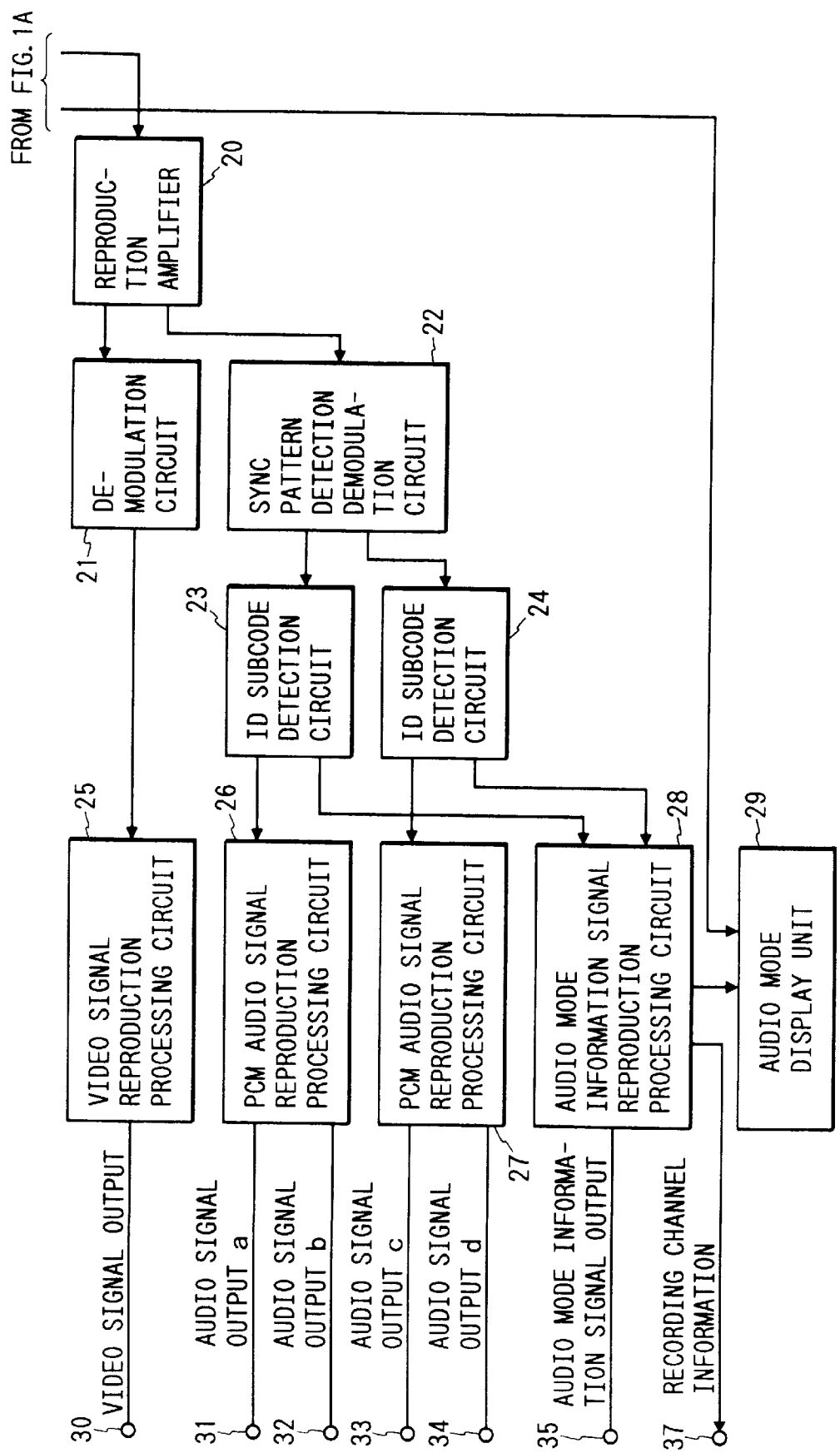

AFTER-RECORDING INFORMATION DISCRIMINATION SIGNAL

AFTER-RECORDING INFORMATION DISCRIMINATION SIGNAL

FOUR CHANNEL SIMULTANEOUS
RECORDING DISCRIMINATION SIGNAL

FOUR CHANNEL SIMULTANEOUS
RECORDING DISCRIMINATION SIGNAL

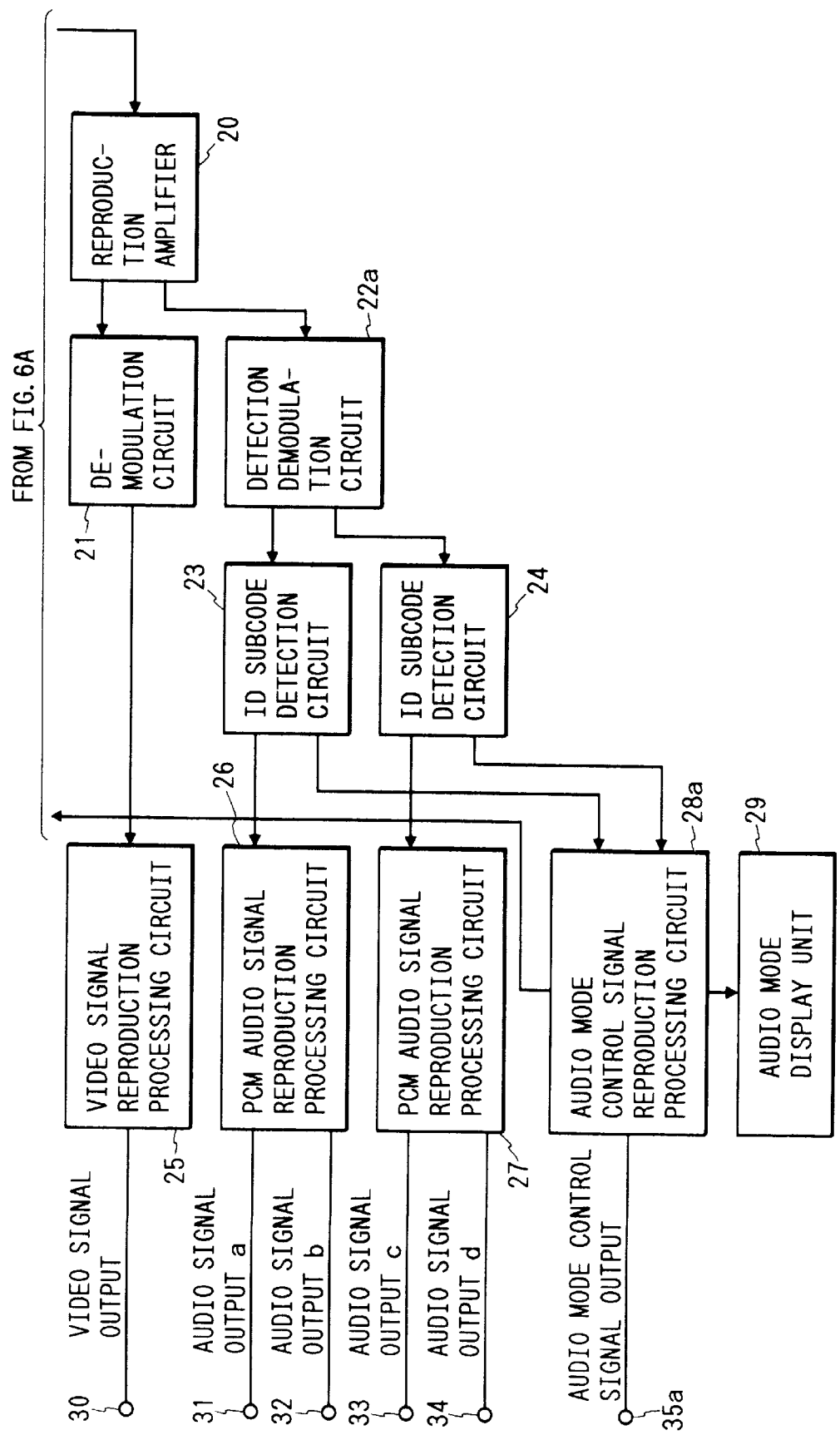

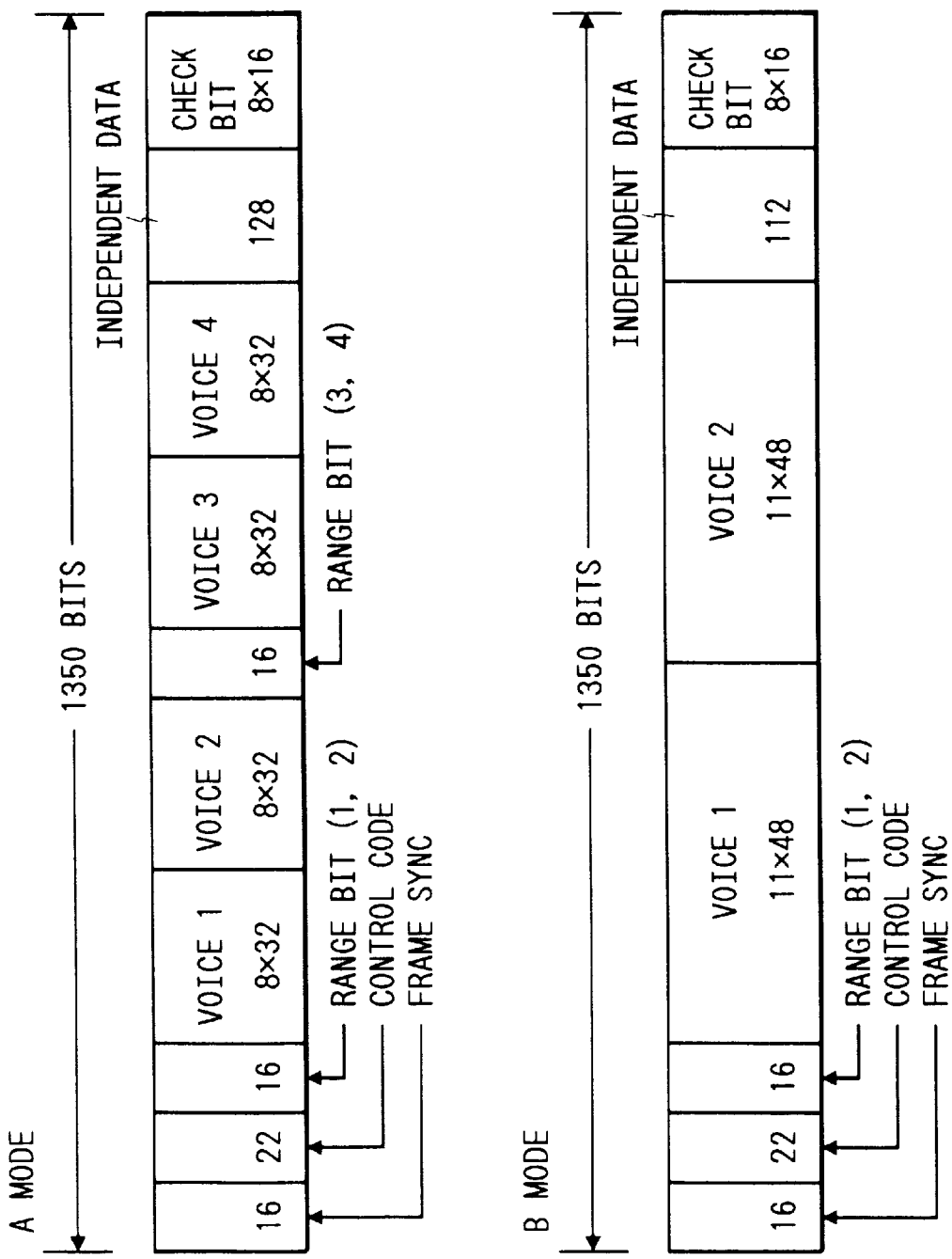

APPARATUS FOR RECORDING AND REPRODUCING AN AUDIO MODE INFORMATION SIGNAL CORRESPONDING TO AN AUDIO MODE OF A MULTI-CHANNEL AUDIO SIGNAL

This application is a continuation of application Ser. No. 08/151,357, filed Nov. 12, 1993, now abandoned.

compatible to the sound mode information of sound channels such as the dual national language or multi-national language broadcast and the stereo broadcast.

On the other hand, in a hi-vision broadcast (MUSE) of Japan, four channels of sound signals in an A-mode and two channels in a B-mode are transmitted and the various modes shown in Table 1 are available.

TABLE 1

| | | Sound Mode Control Code Bits | | | | | | Sound Mode (No. of Channels) | | | | Sound Channel Used (—; No sound signal) | | | |
|---|---|---|---|---|---|---|---|---|---|---|---|---|---|---|---|
| | | | | | | | | TV Sound | | Added Indep. Sound | | | | | |
| | 1 | 2 | 3 | 4 | 5 | 6 | Mode | Ste | Mono | Ste | Mono | CH 1 | CH 2 | CH 3 | CH 4 |
| * | 0 | 0 | 0 | 0 | 0 | 0 | A | 1 | | 1 | | L | R | $L_H$ | $R_H$ |
|   | 0 | 0 | 0 | 0 | 1 | 0 | A | 1 | | | 2 | L | R | $Main_H$ | $Sub_H$ |
|   | 0 | 0 | 0 | 1 | 0 | 0 | A | 1 | | | 1 | L | R | $Main_H$ | — |
| * | 0 | 0 | 0 | 1 | 1 | 0 | A | 1 | | | | L | R | — | — |
| * | 0 | 0 | 1 | 0 | 0 | 0 | A | | 2 | 1 | | Main | Sub | $L_H$ | $R_H$ |
|   | 0 | 0 | 1 | 0 | 1 | 0 | A | | 2 | | 2 | Main | Sub | $Main_H$ | $Sub_H$ |
| * | 0 | 0 | 1 | 1 | 0 | 0 | A | | 2 | | 1 | Main | Sub | $Main_H$ | — |
|   | 0 | 0 | 1 | 1 | 1 | 0 | A | | 2 | | | Main | Sub | — | — |
| * | 0 | 1 | 0 | 0 | 0 | 0 | A | | | 1 | 1 | Main | — | $L_H$ | $R_H$ |
|   | 0 | 1 | 0 | 0 | 1 | 0 | A | | | 1 | 2 | Main | — | $Main_H$ | $Sub_H$ |
|   | 0 | 1 | 0 | 1 | 0 | 0 | A | | | 1 | 1 | Main | — | $Main_H$ | — |
| * | 0 | 1 | 0 | 1 | 1 | 0 | A | | | 1 | | Main | — | — | — |
| * | 0 | 1 | 1 | 0 | 0 | 0 | A | | | | 1 | — | — | $L_H$ | $R_H$ |
|   | 0 | 1 | 1 | 0 | 1 | 0 | A | | | | 2 | — | — | $Main_H$ | $Sub_H$ |
|   | 0 | 1 | 1 | 1 | 0 | 0 | A | | | | 1 | — | — | $Main_H$ | — |
|   | 0 | 1 | 1 | 1 | 1 | 0 | A | | | | | — | — | — | — |
| * | 0 | 0 | 0 | 0 | 0 | 1 | A | | | | | $L_{MA}$ | $R_{MA}$ | $L_{SU}$ | $R_{SU}$ |
|   | 0 | 0 | 0 | 0 | 1 | 1 | A | 1 | 2 | | | $L_{MA}$ | $R_{MA}$ | $Sub^1$ | $Sub^2$ |
|   | 0 | 0 | 0 | 1 | 0 | 1 | A | 1 | 1 | | | $L_{MA}$ | $R_{MA}$ | Sub | — |
|   | 0 | 0 | 1 | 0 | 1 | 1 | A | | 4 | | | Main | $Sub^1$ | $Sub^2$ | $Sub^3$ |
|   | 0 | 0 | 1 | 1 | 0 | 1 | A | | 3 | | | Main | $Sub_1$ | $Sub_2$ | — |
| * | 0 | 1 | 1 | 0 | 0 | 1 | A | 4 CH ster (3–1 system) | | | | L | R | C | S |
|   | 0 | 1 | 1 | 0 | 1 | 1 | A | 3 CH ster mono 1 chann | | | | L | R | C | Sub |
|   | 0 | 1 | 1 | 1 | 0 | 1 | A | 3 CH ster | | | | L | R | C | — |
|   | 0 | 1 | 1 | 1 | 1 | 1 | A | 4 CR ster (2—2 system) | | | | $L_{SU}$ | $R_{SU}$ | $L_{SU}$ | $R_{SU}$ |
| * | 1 | 0 | 0 | 1 | 1 | 0 | B | 1 | | | | L | R | | |
| * | 1 | 0 | 1 | 1 | 1 | 0 | B | | 2 | | | Main | Sub | | |
| * | 1 | 1 | 0 | 1 | 1 | 0 | B | | 1 | | | Main | — | | |
|   | 1 | 1 | 1 | 1 | 1 | 0 | B | | | | | — | — | | |

*Sound mode to be used for the time being  Suffix H indicates added independent sound signal

BACKGROUND OF THE INVENTION

1. Field of the Invention

The present invention relates to a recording and reproducing apparatus, and more particularly to a recording and reproducing apparatus for recording and reproducing an audio mode information signal corresponding to an audio mode of a multi-channel audio signal in a high grade television broadcast.

2. Related Background Art

A VTR (video tape recorder) has been known as a recording and reproducing apparatus which can record a dual national language broadcast and a stereo-broadcast, but in this apparatus, when the dual national language broadcast is to be recorded and reproduced, only a main sound or a sub-sound is selected by a sound selection switch to prevent the mixture of the main sound and the sub-sound.

The number of sound channels is two or three.

A VTR used in a broadcasting station has been known as a VTR having a large number of sound channels and the number of sound channels is four to eight, but it is not In order to identify various modes, six sound mode control signal bits are allocated as shown in Table 1. As shown in FIG. 9, the sound mode control signal is transmitted as a part of control codes (22 bits) together with the sound signals of the respective channels as a MUSE bit stream in a MUSE signal.

In a receiving station, an audio signal of each channel is decoded (as a pre-selection audio signal) from the MUSE bit stream by an audio decoder, and a channel-selected or channel-exchanged audio signal (a post selection audio signal) is outputted in accordance with a content of an audio mode control signal decoded by the audio decoder or the selection operation by an audience.

For example, assuming that an A-mode 4-channel 3-1 system 4-channel stereo signal is transmitted via CH 1 for L (left), CH 2 for R (right), CH 3 for C (center) and CH 4 for S (surround), the L, R, C and S are selected if an audio reproducing system is a 4-channel system, and if it is a 2-channel system, $$L_1 = L + 0.7C + j0.7S$$

$$R_1 = R + 0.7C + j0.7S$$

are selected by a matrix conversion. Those are post selection audio signals.

When a video signal containing the audio signal and the audio mode control signal is recorded in a VTR and reproduced therefrom, since a user selection condition is not uniquely determined, it is desirable that the VTR records the pre-selection audio signal and the audio mode control signal as they are and in the reproduction mode, it outputs the post selection audio signal in accordance with the user condition (the number of channels of the audio reproducing system and a language).

Since the prior art recording and reproducing apparatus is constructed as described above, when a tape having a two-language broadcast recorded thereon is to be reproduced, it is necessary to select a desired one of the languages by an audio selection switch, and when the audio channels are more than two, it is necessary to check the audio modes and the contents of the respective audio channels because the audio mode information does not correspond to the audio channels such as two-language or multi-language broadcast and the stereo braodcast. This is troublesome.

When a so-called after-recording in which an audio signal on a magnetic tape is recorded later is to be done, the audio mode may be changed by the after-recording if the number of channels is large. A VTR which solves the above problem and yet allows the recording and reproduction of the audio mode control signal has not been available.

SUMMARY OF THE INVENTION

It is an object of the present invention to provide a recording and reproducing apparatus which allows the after-recording and recording/reproduction of the audio signal while the matching of the audio mode of the audio signal is maintained in the after-recording.

In a preferred embodiment, the recording and reproducing apparatus comprises first input means for inputting a multi-channel audio signal, second input means for inputting audio mode identification information for identifying an audio mode, record means for dividing the multi-channel audio signal to record the audio signal in a plurality of areas together with audio mode information containing the audio mode identification information, reproduction means for reproducing the information recorded by the record means, and generation means for generating audio mode information in accordance with the audio mode information reproduced by the reproduction means.

Other objects and advantages of the present invention will become apparent from the following detailed description taken in conjunction with the appended claims.

BRIEF DESCRIPTION OF THE DRAWINGS

FIG. 1 is comprised of FIGS. 1A and 1B showing block diagrams of a 4-channel VTR of first to third embodiments of the present invention;

FIG. 9 shows a format of a MUSE bit stream.

DETAILED DESCRIPTION OF THE PREFERRED EMBODIMENTS

Figure 2:
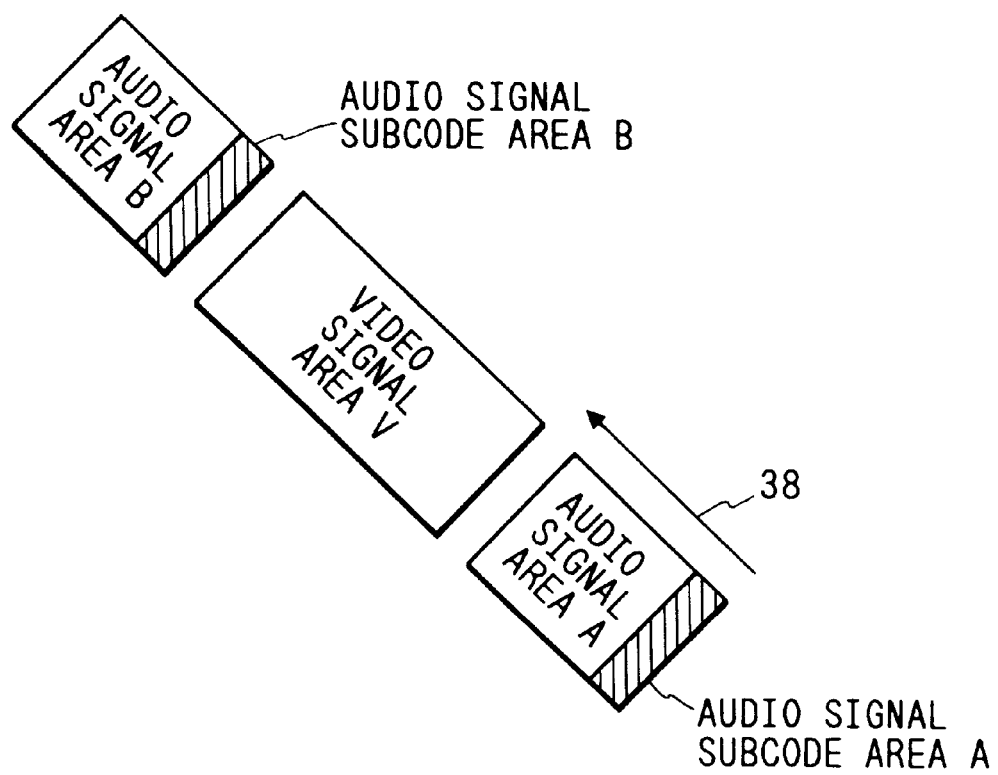
FIG. 2 shows a record format of a record track on a magnetic tape in the first to third embodiments.

Hereinafter, embodiments of the present invention will be described.

FIGS. 1A and 1B show a first embodiment which is applied to a 4-channel audio VTR.

The first embodiment is explained below.

In FIGS. 1A and 1B, in a record mode, a video signal input 1 is frequency-converted and emphasized by a video signal processing circuit 7 and modulated to a video modulation signal by a video signal modulation circuit 13. The video modulation signal is supplied through a video/audio signal input switching circuit 15 to a record amplifier 16 by which it is amplified and it is then recorded on a magnetic tape 18 by a recording magnetic head 17. An audio signal input a 2 and an audio signal input b 3 are analog-to-digital converted by a PCM audio signal processing circuit 8 and processed for scramble/error correction code and then they are supplied to an ID/sub-code insertion circuit 11. Similarly, an audio signal input c 4 and an audio signal input d 5 are processed in a similar manner by a PCM audio signal processing circuit 9 and they are supplied to an ID/sub-code insertion circuit 12.

An audio mode information signal input 6 containing an audio mode control signal of the audio signal input is supplied to an audio mode information signal processing circuit 10 together with record channel information 36 where the audio modes of the respective channels (for example, monaural, two-language/multi-language, stereo 2-channel, stereo 4-channel or a combination thereof) is encoded and it is supplied to the ID/sub-code insertion circuits 11 and 12 and an audio mode display unit 29.

In the ID/sub-code insertion circuit 11, a sub-code A to an audio signal area A of FIG. 2 outputted from the audio mode information signal processing circuit 10 is added to the audio signal input a 2 and the audio signal input b 3 processed by the PCM audio signal processing circuit 8, and it is supplied to a SYNC pattern insertion/modulation circuit 14. While it will be described in detail later, the sub-code A has an ID which contains information on an address of the audio signal area, a sampling frequency and the number of quantumizing bits, and an error detection code CRCC. Similarly, in the ID/sub-code insertion circuit 12, a sub-code B to the audio signal area B of FIG. 2 outputted from the audio mode information signal processing circuit 10 is added to the audio signal input c 4 and the audio signal input d 5 processed by the PCM audio signal processing circuit 9, and it is applied to the SYNC pattern insertion/modulation circuit 14. The sub-code B has similar information to that of the sub-code A.

In the SYNC pattern insertion/modulation circuit 14, a SYNC pattern is inserted to each of the audio signals and they are modulated to comply with the transmission line characteristics of the magnetic tape 18 and the recording magnetic head 17. The modulated signals are switched between the record video signal and the record audio signal at a predetermined time interval by an input switching circuit 15, amplified by a recording amplifier 16 and recorded in the respective area shown in FIG. 2 on the magnetic tape 18 through the magnetic recording head 17.

FIG. 2 shows a record track on the magnetic tape 18, which includes a video signal area V, an audio signal area A, an audio signal sub-code area A, an audio signal area B and an audio signal sub-code area B. Numeral 38 denotes a direction of head scan. Each gap between the areas is a guard space.

In the reproduction mode, of the reproduced video signal and the reproduced audio signal reproduced by the reproducing head 19 from the magnetic tape 18 and amplified by the reproducing amplifier 20, the reproduced video signal is demodulated into a video demodulation signal by a demodulation circuit 21, and it is deemphasized and frequency-reconverted by a video signal reproduction circuit 25 to produce a video signal output 30. The reproduced audio signal is supplied to a SYNC pattern detection/demodulation circuit 22 which detects the SYNC pattern and synchronizes and demodulates it, and the audio signal area A is supplied to an ID/sub-code detection circuit 23 while the audio signal area B is supplied to an ID/sub-code detection circuit 24.

In the ID/sub-code detection circuit 23, the ID's for the audio signal a and the audio signal b and the sub-code including the audio mode control signal are detected and the audio mode information is supplied to an audio mode information signal reproducing circuit 28 and the audio signal is supplied to PCM audio signal reproducing circuits 26 and 27. The PCM audio signal reproducing circuit 27 processes in the same manner as that described above to produce an audio signal output c 33 and an audio signal output d 34.

In the audio signal processing circuit 28, the audio modes of the respective channels are decoded by the audio mode information supplied from the ID/sub-code detection circuits 23 and 24 and supplies them to an audio mode display unit 29 and produces an audio mode information signal output 35.

A so-called after-recording operation in which only one of the signal areas on the recorded magnetic tape in the 4-channel audio VTR is now explained.

A list of the audio modes in the MUSE system which is one of the hi-vision broadcast transmission systems is shown in Table 1. The audio signal of the hi-vision broadcast in the MUSE system is a main source for the audio signal in the hi-vision VTR.

As seen from Table 1, in the A-mode stereo in the MUSE system hi-vision broadcast, the audio signal which is main in most of the audio modes is concentrated in the first audio channel CH 1 and the second audio channel CH 2. In the 4-channel stereo audio, the front left and right audio signals which are main are allocated to the first audio channel CH 1 and the second audio channel CH 2.

Thus, of the four channels of audio signals, the main audio signals are those of the first and second audio channels. Accordingly, the after-recording may be done by after-recording new audio signals on the third and fourth audio channels while the audio signals on the first and second channels are maintained together with the video signals. An edit operation may be done by recording the video signal and the audio signal at different times.

When the 4-channel stereo audio signals are recorded together with the video signal in the MUSE system, the video signal area V, the audio signal sub-code area A which includes the audio signal area A and a sub-code area thereof, and the audio signal sub-code area B which includes the audio signal area B and the sub-code area thereof are formed on the magnetic tape 18 as shown in FIG. 2.

Figure 3A:
FIGS. 3A to 3C show data formats of an audio sub-code area in the first embodiment.
Figure 3B:
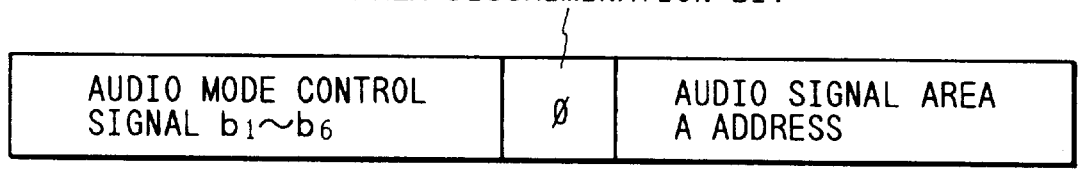
Figure 3C:
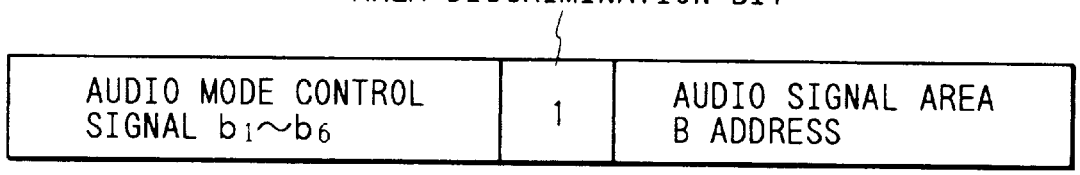

The audio signal sub-code area A is formatted as shown in FIGS. 3A and 3B, and the audio signal sub-code area B is formatted as shown in FIGS. 3A and 3C.

FIG. 3A shows the format of the audio signal sub-code areas A and B. SYNC is used to detect the sub-code areas A and B. As shown in FIGS. 3B and 3C, ID comprises an audio mode control signal ($b_1$–$b_6$) of the audio signal area, an identification bit for identifying the area A and the area B and addresses of the audio signal areas A and B for detecting the time continuity of the audio signal areas A and B. A CRCC error detection code is added to permit the error detection for the ID. The audio mode control signal ($b_1$–$b_6$) of FIGS. 3B and 3C is a 6-bit signal provided for each of the audio modes shown in Table 1.

The MUSE system A-mode television audio signal is recorded on one stereo channel and an additional independent audio signal is recorded on one stereo channel together with the video signal, the audio mode control signals A and B ($b_1$, $b_2$, $b_3$, $b_4$, $b_5$, $b_6$) of the audio signal sub-code areas A and B on the magnetic tape is (0, 0, 0, 0, 0, 0).

When the above magnetic tape is reproduced, the audio mode control signals A and B of audio sub-code areas A and B are identical and the recorded audio mode and the reproduced audio mode match. When the audio signal supplied from the audio signal input c 4 and the audio signal input d 5 is to be after-recorded as one additional independent audio A-mode stereo channel in the audio signal area B on the magnetic tape, the audio mode control signal ($b_1$, $b_2$, $b_3$, $b_4$, $b_5$, $b_6$) is recorded as (0, 1, 1, 0, 0, 0). In the reproduction mode, the audio mode control signal A and the audio mode control signal B do not match.

In this case, the audio mode information signal reproducing circuit 28 produces an audio mode control signal for the audio signal output a 31 and the audio signal output b 32 from the audio mode control signal A and an audio mode control signal for the audio signal output c 33 and the audio signal output d 34 from the audio mode control signal B, and reconstructs the audio mode control signal ($b_1$, $b_2$, $b_3$, $b_4$, $b_5$, $b_6$) for the four channel audio signals to produce the audio mode information signal output 35.

When the after-recorded magnetic tape is reproduced, the audio signal of one stereo channel and the audio signal of another stereo channel are present and the audio mode information signal 35 of (0, 0, 0, 0, 0, 0) is produced by the audio mode information signal reproducing circuit 28.

When the audio signal recorded by after-recording one additional independent audio stereo channel to the audio signal area B on the 4-channel (3-1 system) stereo magnetic tape is reproduced, the same result as that described above is obtained.

In the first embodiment, the above operation may be attained without using the record channel information 36 in the audio mode information signal processing circuit 10, that is, by recording only the audio mode information signal input 6 in the record mode together with the audio signal sub-code areas A and B as the audio mode control signals A and B.

While the audio signal inputs and the audio signal outputs are analog signals in the above description, they may be digital signals.

The audio mode information signal input 6 and the audio mode information signal output 35 may be a MUSE bit stream shown in FIG. 9.

As shown in FIG. 2, the audio signal areas A and B and the audio signal sub-code area are provided one area for two channels of the audio input signals, although they may be provided one area for each channel or one area for three or more channels.

A second embodiment is now explained.

In the present embodiment, in the record mode, the audio mode information signal 6 of the audio signal input is processed in the audio mode information signal processing circuit 10 together with the record channel information 36 of the after-recording by encoding the audio modes of the respective channels (for example, monaural, two-language/multi-language, stereo 2-channel, stereo 4-channel or a combination thereof), and they are supplied to the ID/sub-code insertion circuits 11 and 12 and the audio mode display unit 29.

In the reproduction mode, the ID/sub-code detection circuit 23 detects the ID's of the audio signal a and the audio signal b and the sub-code including the after-recording information and the audio mode information, supplies the after-recording information and the audio mode information to the audio mode information reproducing circuit 28, and supplies the audio signal to the PCM audio signal reproduction processing circuit 26, which performs the error correction and the descramble digital-to-analog conversion to produce the audio signal output a 31 and the audio signal output b 32. Similarly, the PCM audio signal reproduction circuit 27 processes the signals in the manner described above to produce the audio signal output c 33 and the audio signal output d 34.

The audio mode information signal reproduction circuit 28 decodes the signals into the audio modes of the respective channels based on the after-recorded information and the audio mode information supplied from the ID/sub-code detection circuits 23 and 24, and supplies them to the audio mode display unit 29, and produces the audio mode information signal output 35 and the record channel information 37 of the after-recording.

Figure 4A:
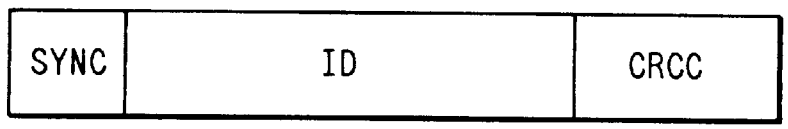
FIGS. 4A to 4C show data formats of the audio sub-code area in the second embodiment.
Figure 4B:
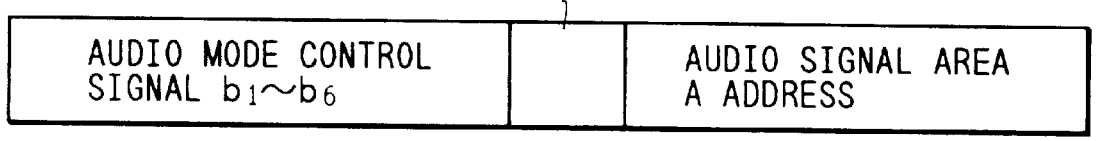
Figure 4C:
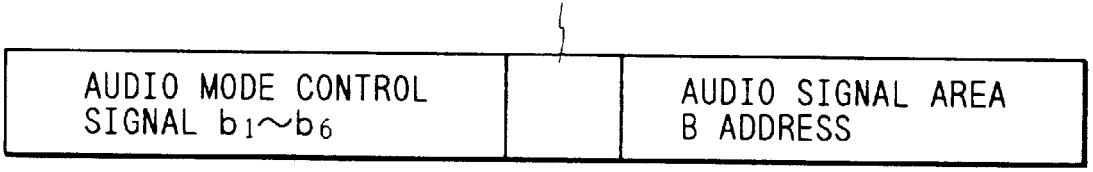

In this case, the audio signal sub-code area A is formatted as shown in FIGS. 4A and 4B, and the audio signal sub-code area B is formatted as shown in FIGS. 4A and 4C.

FIG. 4A shows a format of the audio signal sub-code areas A and B, SYNC is used to detect the sub-code areas A and B, and as shown in FIGS. 4B and 4C, ID comprises an audio mode control signal ($b_1$–$b_6$) of the audio signal area, an identification bit for detecting the after-recording information, and addresses of the audio signal areas A and B for detecting the time continuity of the audio areas A and B. A CRCC error detection code is added to permit the error detection for the ID.

When the MUSE system A-mode television audio signal is recorded in one stereo channel and the additional independent audio signal is recorded in one channel together with a video signal, the audio mode control signals A and B ($b_1$, $b_2$, $b_3$, $b_4$, $b_5$, $b_6$) of the audio signal sub-code areas A and B is (0, 0, 0, 0, 0, 0) and the detection bits A and B of the after-recording information are 0.

When the above magnetic tape is reproduced, the audio mode control signals A and B of the respective sub-code areas are identical and the recorded audio mode and the reproduced audio mode match.

Since both of the after-recording information detection bits A and B are 0, it is determined that the four channels are all original audio recording.

When the audio signals supplied from the audio signal input c 4 and the audio signal input d 5 are to be after-recorded in the audio signal area B on the magnetic tape as one additional independent audio A-mode stereo channel, the audio mode control signal B ($b_1$, $b_2$, $b_3$, $b_4$, $b_5$, $b_6$) is recorded as (0, 1, 1, 0, 0, 0) and the after-recording information detection bit B is recorded as 1.

In this case, in the audio mode information signal processing circuit 28, the audio mode control signal for the audio signal output a 31 and the audio signal output c 32 is produced from the audio mode control signal A, and the audio mode control signal for the audio signal output c 33 and the audio signal output d 34 is produced from the audio mode control signal B, and the audio mode control signal ($b_1$, $b_2$, $b_3$, $b_4$, $b_5$, $b_6$) for the 4-channel audio signal is reformatted to produce the audio mode information signal output 35 and the after-recording record channel information signal output 37.

When the after-recorded magnetic tape is reproduced, the audio signals of one stereo channel and another stereo channel are included. Thus, the audio mode information signal processing circuit 28 produces the audio mode information signal output 35 of (0, 0, 0, 0, 0, 0).

From the record channel information signal output 37 of the after-recording, it is seen that the audio signals of the channel 3 and channel 4 are after-recorded ones.

When the audio signal recorded by after-recording one additional independent audio stereo channel to the audio signal area B on the 4-channel (3-1 system) stereo magnetic tape is reproduced, the same result as that described above is obtained. However, when the recorded audio mode after-records only a sub-sound of the 4-channel stereo broadcast in the audio signal area B for the 4-channel stereo broadcast, ($b_1$, $b_2$, $b_3$, $b_4$, $b_5$, $b_6$) of the audio mode control signal A and the audio mode control signal B are (0, 1, 1, 0, 0, 1) and match each other.

In this case, the content is different from the original 4-channel stereo broadcast. In the present invention, since the identification for the after-recording information is recorded in each audio signal sub-code area, the above problem is avoided by determining if the detection bit is 1 or 0 and the audio mode information signal output 35 of (0, 0, 0, 0, 0, 0) is produced in the audio mode information signal reproduction circuit.

From the record channel information signal output 37 of the after-recording, it is seen that the audio signals of the channel 3 and the channel 4 are after-recorded ones.

In the second embodiment, the result of the determination of the after-recording information identification signal may be displayed on the audio mode display unit 29 to indicate to a user whether the audio signal was after-recorded or not.

While the audio signal input and output are analog in the second embodiment, they may be digital signals.

The technological advantages of the present invention can be attained by using the audio mode control signal having a format other than the six bits shown in the Table 1.

The after-recording information identification signal is located between the audio mode control signal and the audio signal area address in FIGS. 4B and 4C, but it may be located in other places to attain the same effect.

While the after-recording information identification signal is shown as one bit in the sub-code area, the same number of bits as that of the sub-channels included in the sub-code area may be provided so that the after-recording information is provided for each audio channel.

A third embodiment is explained.

In the present embodiment, in the record mode, the audio mode information signal 6 of the audio signal input is processed in the audio mode information signal processing circuit 10 together with the record channel information 36 which indicates whether it is the 4-channel simultaneous recording or not by encoding the audio modes of the respective channels (for example, monaural, two-language/ multi-language, stereo 2-channel, stereo 4-channel or a combination thereof), and they are supplied to the ID/sub-code insertion circuits 11 and 12 and the audio mode display unit 29.

In the reproduction mode, the ID/sub-code detection circuit 23 detects the ID's of the audio signal a and the audio signal b and the sub-code including the 4-channel simultaneous recording identification signal and the audio mode information, supplies the audio mode information to the audio mode information reproducing circuit 28, and supplies the audio signal to the PCM audio signal reproduction processing circuits 26 and 27, which performs the error correction and the descramble digital-to-analog conversion to produce the audio signal output a 31 and the audio signal output b 32. Similarly, the PCM audio signal reproduction circuit 27 processes the signals in the manner described above to produce the audio signal output c 33 and the audio signal output d 34.

The audio mode information signal reproduction circuit 28 decodes the audio modes of the respective channels based on the determination result for the 4-channel simultaneous recording identification signal and the audio mode information supplied from the ID/ sub-code detection circuits 23 and 24, and supplies them to the audio mode display unit 29, and produces the audio mode information signal output 35.

Figure 5A:
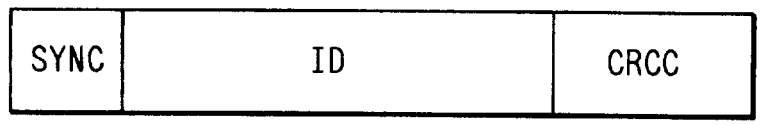
FIGS. 5A to 5C show data formats of the audio sub-code area in the third embodiment.
Figure 5B:
Figure 5C:

In this case, the audio signal sub-code area A is formatted as shown in FIGS. 5A and 5B, and the audio signal sub-code area B is formatted as shown in FIGS. 5A and 5C.

FIG. 5A shows a format of the audio signal sub-code areas A and B, SYNC is used to detect the sub-code areas A and B, and as shown in FIGS. 5B and 5C, ID comprises an audio mode control signal ($b_1$–$b_6$) of the audio signal area, a 4-channel simultaneous recording identification bit for indicating whether it is the 4-channel simultaneous recording or not, and addresses of the audio signal areas A and B for detecting the time continuity of the audio areas A and B. A CRCC error detection code is added to permit the error detection for the ID.

When the MUSE system A-mode television audio signal is recorded in one stereo channel and the additional independent audio signal is recorded in one channel together with a video signal, the audio mode control signals A and B ($b_1$, $b_2$, $b_3$, $b_4$, $b_5$, $b_6$) of the audio signal sub-code areas A and B is (0, 0, 0, 0, 0, 0) and the 4-channel simultaneous recording identification signal is 1.

When the above magnetic tape is reproduced, the audio mode control signals A and B of the respective sub-code areas and the 4-channel simultaneous recording identification signal are identical and the recorded audio mode and the reproduced audio mode match. When the audio signals supplied from the audio signal input c 4 and the audio signal input d 5 are to be after-recorded in the audio signal area B on the magnetic tape as one additional independent audio A-mode stereo channel, the audio mode control signal B ($b_1$, $b_2$, $b_3$, $b_4$, $b_5$, $b_6$) is recorded as (0, 1, 1, 0, 0, 0) and the 4-channel simultaneous recording identification signal is recorded as 0. In the reproduction mode, the audio mode control signal A, the audio mode control signal B and the 4-channel simultaneous recording identification signal do not match.

In this case, in the audio mode information signal processing circuit 28, the audio mode control signal for the audio signal output a 31 and the audio signal output b 32 is produced from the audio mode control signal A, and the audio mode control signal for the audio signal output c 33 and the audio signal output d 34 is produced from the audio mode control signal B, and the audio mode control signal ($b_1$, $b_2$, $b_3$, $b_4$, $b_5$, $b_6$) for the 4-channel audio signal is reformatted to produce the audio mode information signal output 35.

When the after-recorded magnetic tape is reproduced, the audio signals of one stereo channel and another stereo channel are included. Thus, the audio mode information signal processing circuit 28 produces the audio mode information signal output of (0, 0, 0, 0, 0, 0).

When the audio signal recorded by after-recording one additional independent audio stereo channel to the audio signal area B on the 4-channel (3-1 system) stereo magnetic tape is reproduced, the same result as that described above is obtained. However, when the recorded audio mode after-records only a sub-sound of the 4-channel stereo broadcast in the audio signal area B for the 4-channel stereo broadcast, ($b_1$, $b_2$, $b_3$, $b_4$, $b_5$, $b_6$) of the audio mode control signal A and the audio mode control signal B are (0, 1, 1, 0, 0, 1) and match each other.

In this case, the content is different from the original 4-channel stereo broadcast. In the present invention, since the 4-channel simultaneous recording identification signal is recorded in each audio signal sub-code area, the above problem is avoided by determining the match/mismatch and the audio mode information signal output 35 of (0, 0, 0, 0, 0, 0) is produced in the audio mode information signal reproduction circuit.

In the third embodiment, the determination result of the 4-channel simultaneous recording identification signal may be displayed on the audio mode display unit 29 to indicate to a user whether the audio signals are the 4-channel simultaneous recording ones or not.

While the audio signal input and output are analog in the third embodiment, they may be digital signals.

The audio mode control signal to be recorded may be a 6-bit signal other than those shown in Table 1 or other formats of more or less bits.

A fourth embodiment is now explained.

Figure 6A:
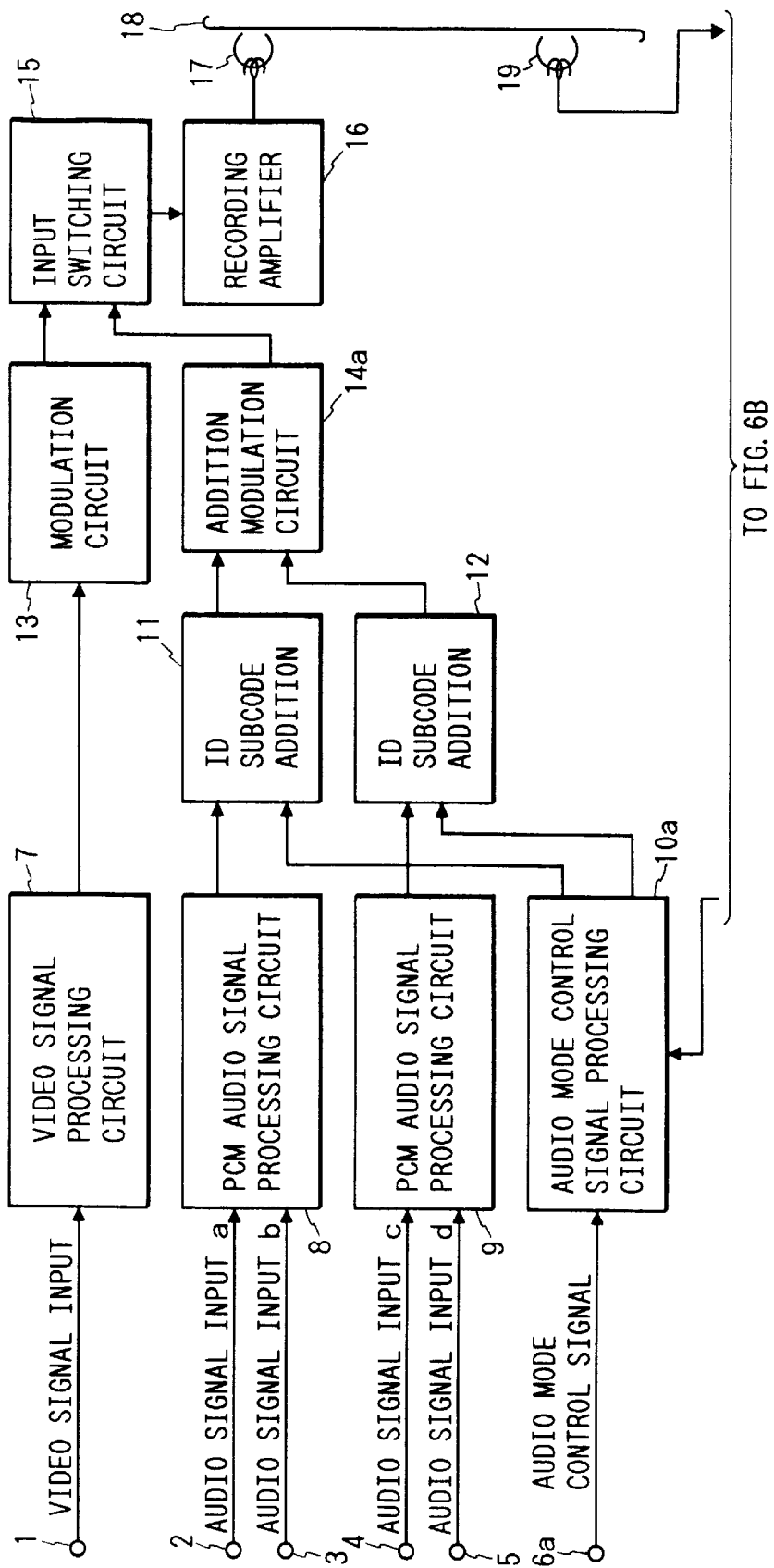
FIG. 6 is comprised of FIGS. 6A and 6B showing block diagrams of a 4-channel VTR of a fourth embodiment of the present invention.
Figure 7:
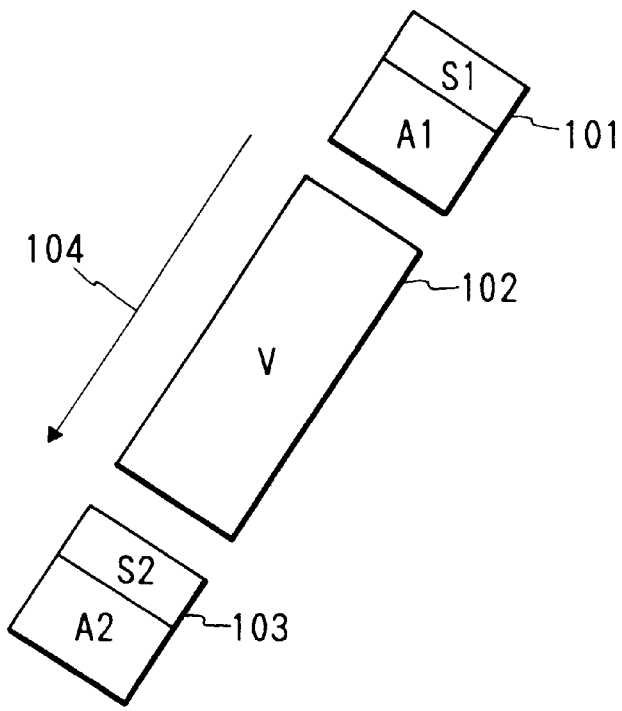
FIG. 7 shows a record format of a record track on the magnetic tape in the fourth embodiment.
Figure 8:
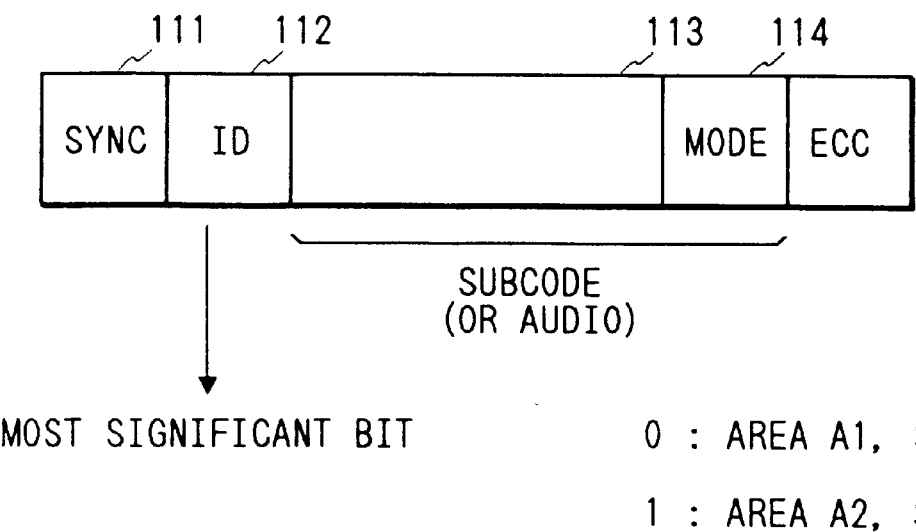
FIG. 8 shows a data format of the audio sub-code area in the fourth embodiment.

FIGS. 6A and 6B show a block diagram of a VTR of the present embodiment. In the present embodiment, two channels may be after-recorded in the channel audio recording. In FIGS. 6A and 6B, like elements to those of FIGS. 1A and 1B are designated by like numerals. FIG. 7 shows areas of the record signals in a format of the record track in the present embodiment, and FIG. 8 shows data structures of the areas.

The recording in the non-after-recording mode is first described.

In FIGS. 6A and 6B, a decoded video signal 1 from a MUSE decoder (not shown), 4-channel decoded audio signals (pre-selection audio signals) a, b, c, d from an audio decoder in the MUSE decoder and an audio mode control signal 6a from the audio decoder are supplied.

The video signal input 1 is processed by a video signal processing circuit 7 and a modulation circuit 13 in the same manner as that of a conventional analog VTR, and a resulting video record signal is supplied to an input switching circuit 15.

The audio signal inputs a-d are processed 2 channels at a time, that is, the audio signal inputs a and b are processed by a PCM audio signal processing circuit 8 and the audio signal inputs c and d are processed by the PCM audio signal processing circuit 9 in the same manner as that of the conventional recorder, and the results are supplied to ID/sub-code insertion circuits 11 and 12.

On the other hand, the audio mode control signal 6a is code-converted by an audio mode control signal processing circuit 10a. In the non-after-recording mode, the present circuit is through and the input audio mode control signal 6a is supplied to the ID/sub-code insertion circuits 11 and 12 as it is, and it is added to the audio signal as a portion of a sub-code area to be described later, and an error correction code ECC and a digital synchronization code SYNC are added by an insertion/modulation circuit 14a. It is further digitally modulated into an audio record signal which is supplied to an input switching circuit 15.

The input switching circuit 15 switches two input signals in time and outputs a video record signal or an audio record signal in accordance with the format of FIG. 7, and it is recorded on a magnetic tape 8 by a recording amplifier 16 and a recording magnetic head 17. As shown in FIG. 7, a sub-code S1 corresponding to the audio signal inputs a and b shown by A1 is recorded in an area 101, and a sub-code S2 corresponding to the audio signal inputs c and d shown by A2 is recorded in an area 103, by switching. Numeral 104 denotes a direction of head scan.

FIG. 8 shows a data format of the sub-code area. In FIG. 8, it is grouped to error correction code (ECC) blocks, and an ID code 112 for identifying each block and a digital synchronization code SYNC are added to an audio or sub-code 113.

The audio mode control signal is recorded in a MODE area 114 which is a part of the sub-code area 113 but since the volume of information is small it need not be recorded in each track. In order to facilitate the area identification in the reproduction mode, a most significant bit of the ID is used. If it is 0, it indicates the areas A1, S1 of FIG. 7, and if it is 1, it indicates the areas A2, S2.

The audio mode control signal is recorded in this manner on the magnetic tape. In the non-after-recording mode, the same code as that of the area S1 is written in the area S2. A reproduction process for the above record is now described.

The video reproduced signal is demodulated by a demodulation circuit 21 in an analog form and it is converted to a base-band signal by a video signal reproduction circuit 25. The audio reproduced signal is digitally demodulated and ECC-decoded by a detection/demodulation circuit 22a and it is supplied to ID/sub-code detection circuits 23 and 24, which detect the sub-codes in the area A1, S2 101 or the area A2, S2 102 by the content of the most significant bit of the ID, and the audio mode control signal 35a is reproduced by the audio mode control signal processing circuit 28a.

On the other hand, the audio signal is decoded into a base-band audio signal (pre-selection audio signal), two channels at a time, by PCM audio signal reproduction circuits 26 and 27 as it is in the conventional PCM reproducing apparatus, and an output which conforms to the status of the audio reproducing apparatus is selected by a selector or an audio mode decoder (not shown) and it is supplied to an audience. Since the same audio mode control signal is written in the areas S1 and S2, either one may be used.

A record process in the after-recording mode is now explained.

In the following description, the recording and reproducing process of the video and audio signals is essentially identical to that in the non-after-recording mode and hence it is omitted, and only the audio mode identification code is described.

In the after-recording mode, the audio mode identification signal (the pre-recorded audio mode) in the area S1 101 which is advanced in time is decoded by the ID/sub-code detection circuit 23 and the audio mode control signal reproduction circuit 28a of FIGS. 6A and 6B, and it is supplied to the audio mode control signal processing circuit 10a. The audio mode identification code of the audio signal to be recorded in the area S2 103 for the after-recording is supplied to the other input of the audio mode control signal processing circuit 10a, and the audio mode identification code for the four channels after the after-recording is generated.

Referring to Table 1, when the recorded audio signal is one A-mode TV video stereo channel, the audio mode control signal is (0, 0, 0, 1, 1, 0), and if the after-recording of the A-mode monaural one channel (0, 1, 0, 1, 1, 0) is to be made thereto, a new mode is an A-mode stereo one channel, monaural one channel (0, 0, 0, 1, 0, 1), and the audio mode control signal processing circuit 10a outputs this code which is recorded in the area S2 103 through the ID/sub-code insertion circuit 12 in the same process as that in the non-after recording mode.

A reproduction process in the record mode is described.

The reproduction process is essentially identical to that in the non-after-recording mode but only the audio mode identification code from the area S2 103 updated in the after-recording and decoded through the ID/sub-code detection circuit 24 and the audio mode control signal reproduction circuit 28a is outputted to the audio mode control signal 35a as a valid code, and an output which complies with the status of the audio reproducing apparatus is selected by the selector or audio mode decoder (not shown) and it is supplied to the audience.

While the MUSE signal is explained in the embodiment, a base-band signal may be used to attain the same effect.

In a case of the base-band signal, it is anticipated that the number of types of audio modes increases, but Table 1 may be expanded. Further, even if the audio mode identification code is transmitted in a different form from that of the MUSE bit stream, it has no connection with the input/output form of the present invention.

Besides the audio mode identification information, an expanded control signal indicating hysteresis of the magnetic tape may be used.

While the 4-channel audio VTR with two channels for after-recording is shown in the embodiment, the present invention is not limited to the specific number of channels.

In accordance with the first to third embodiments of the present invention, the audio signal sub-code area including the audio mode control signal is added to the audio signal area to record. Accordingly, it is not necessary to read the audio signal sub-code area including the audio mode control signal on the recording medium by a preceding reproducing head for use in the after-recording and the audio after-recording is attained without increasing the number of heads and the recording and reproducing apparatus which complies with the multi-channel audio signals is provided.

By adding the audio sub-code area including the after-recording information identification signal and the audio mode control signal separately to the audio signal area to record, the bit of the identification signal of the after-recording information may be determined to determine the matching of the audio mode of the 4-channel stereo broadcast even if the audio control signals recorded on the magnetic medium at different times happen to be equal, and yet the recording and reproducing apparatus complies with the 4-channel audio signals which permit the after-recording.

Since a particular audio channel in which the after-recorded audio signal is recorded can be detected by the identification signal of the after-recording information, the content of recording when a dubbing tape is prepared can be readily checked and inadvertent erasure of the original audio signal in the subsequent after-recording is prevented, and the edition is facilitated while the matching of the 4-channel is maintained.

By adding the audio sub-code area including the 4-channel simultaneous recording identification signal and the audio mode control signal separately to the audio signal to record, the matching of the audio modes of the 4-channel stereo broadcast can be determined by determining the matching of the 4-channel simultaneous recording identification signals even if the audio mode control signals recorded on the magnetic medium at different times happen to be equal, and yet the recording and reproducing apparatus complies with the 4-channel audio signals which permit the after-recording.

In accordance with the fourth embodiment of the present invention, the first area for recording the first audio signal and the audio mode control signal which cannot be after-recorded, the second area for recording the second audio signal and the audio mode control signal which can be after-recorded, and the decode means for decoding the audio control signal of the first area are provided, and the new audio mode control signal is generated based on the audio mode control signal of the after-recorded audio signal and the audio mode control signal of the first area decoded by the decode means, and the audio mode control signal is recorded in the second area to properly attain the after-recording.

The present invention may be embodied in any other forms without departing from the spirit and principal features of the invention.

In other words, the foregoing description of the embodiments has been given for illustrative purposes only and should not be construed as imposing any limitation in any respect.

The scope of the invention is, therefore, to be determined solely by the following claims and not limited by the text of the specification and alterations made within a scope equivalent to the scope of the claims fall within the true spirit and scope of the invention.

What is claimed is:

1. A reproducing apparatus for reproducing a recorded multi-channel audio signal from a plurality of recording areas together with audio mode information including audio mode control information for identifying an audio mode, the audio mode information being recorded in each of the plurality of recording areas, said apparatus comprising:
   (a) detection means for detecting the audio mode information recorded in each of the plurality of recording areas; and
   (b) processing means for discriminating whether after-recording has been performed, according to whether predetermined information included respectively in the plurality of audio mode information detected by said detection means match with each other, and for generating, according to a result of the discrimination, audio mode control information of the reproduced multi-channel audio signal.

2. A reproducing apparatus according to claim 1, further comprising display means for displaying an audio mode in accordance with the audio mode control information processed by processing means.

3. A reproducing apparatus according to claim 1, wherein the audio mode information includes recording information indicating whether or not the audio mode information is multi-channel simultaneous recording information.

4. A reproducing apparatus according to claim 3, further comprising display means for displaying an audio mode in accordance with the audio mode control information processed by said processing means.

5. A reproducing apparatus according to claim 1, wherein the audio mode information includes information indicating whether or not the audio mode information is after-recorded information.

6. A reproducing apparatus according to claim 5, further comprising output means for outputting the after-recorded information in accordance with the detection by said detection means.

7. A reproducing apparatus according to claim 5, further comprising display means for displaying an audio mode in accordance with the audio mode control information processed by said processing means.

8. A recording and reproducing apparatus comprising:
   (a) first input means for inputting a multi-channel audio signal;
   (b) second input means for inputting audio mode control information for identifying an audio mode of the multi-channel audio signal inputted from said first input means;
   (c) recording means for recording the multi-channel audio signal dividedly in a plurality of recording areas together with audio mode information including the audio mode control information, the mode information being recorded in each of the plurality of recording areas;
   (d) reproduction means for reproducing the recorded multi-channel audio signal from a plurality of recording areas together with audio mode information;
   (e) detection means for detecting the audio mode information recorded in each of the plurality of recording areas; and
   (f) processing means for discriminating whether after-recording has been performed, according to whether predetermined information included respectively in the plurality of audio mode information detected by said detection means match with each other, and for generating, according to a result of the discrimination, audio mode control information of the reproduced multi-channel audio signal.

9. A recording and reproducing apparatus according to claim 8, further comprising display means for displaying the audio mode in accordance with the audio mode control information inputted from said second input means.

10. A recording and reproducing apparatus according to claim 8, wherein the audio mode information recorded in each recording area includes area identification information for identifying a recording area.

11. A recording and reproducing apparatus according to claim 8, wherein the audio mode information recorded in each recording area includes information indicating whether or not the audio signal recorded in that area was after-recorded.

12. A recording and reproducing apparatus according to claim 8, wherein the audio mode information recorded in each recording area includes recording identification information indicating whether or not the recorded information is multi-channel simultaneous recording information.

13. A recording and reproducing apparatus according to claim 8, further comprising display means for displaying an audio mode in accordance with audio mode control information processed by said processing means.

14. A reproducing apparatus for reproducing a multi-channel audio signal dividedly recorded in a first recording area and a second recording area on a recording medium together with an audio mode control signal of each recording area, the audio mode control signal being a signal representing the audio mode of the multi-channel audio signal, said apparatus comprising:

(a) detection means for detecting the audio mode control signals recorded in the first and second recording areas; and (b) generating means for discriminating whether after-recording has been performed, according to whether the audio mode control signals in the respective recording areas, detected by said detection means, match with each other, and for generating, according to a result of the discrimination, a new audio mode control signal of the reproduced multi-channel audio signal.

15. A recording and reproducing apparatus comprising:

(a) first input means for inputting a multi-channel audio signal;

(b) second input means for inputting an audio mode control signal for identifying an audio mode of the multi-channel audio signal inputted from said first input means;

(c) recording means for recording the multi-channel audio signal dividedly in a first recording area and a second recording area on a recording medium together with an audio mode control signal, the audio mode control signal being recorded in each of the recording areas;

(d) reproduction means for reproducing the recorded multi-channel audio signal and the audio mode control signal from the first and second recording areas;

(e) detection means for detecting the audio mode control signal recorded in each of the areas; and (f) generating means for discriminating whether after-recording has been performed, according to whether the audio mode control signals in the respective recording areas, detected by said detection means, match with each other, and for generating, according to a result of the discrimination, a new audio mode control signal of the reproduced multi-channel audio signal.

16. A reproducing method of reproducing a recorded multi-channel audio signal from a plurality of recording areas together with audio mode information including audio mode control information for identifying an audio mode, the audio mode information being recorded in each of the plurality of recording areas, said method comprising:

(a) a detection step of detecting the audio mode information recorded in each of the plurality of recording areas; and (b) a processing step of discriminating whether after recording has been performed, according to whether predetermined information included respectively in the plurality of audio mode information detected by said detection step match with each other, and generating, according to a result of the discrimination, audio mode control information of the reproduced multi-channel audio signal.

17. A reproducing method for reproducing a multi-channel audio signal dividedly recorded in a first recording area and a second recording area on a recording medium together with an audio mode control signal of each recording area, the audio mode control signal being a signal representing the audio mode of the multi-channel audio signal, said apparatus comprising:

(a) a detection step of detecting the audio mode control signals recorded in the first and second recording areas; and (b) a generating step of discriminating whether after recording has been performed, according to whether the audio mode control signals in the respective recording areas, detected by said detection step match with each other, and generating, according to a result of the discrimination, a new audio mode control signal of the reproduced multi-channel audio signal.

* * * * *

UNITED STATES PATENT AND TRADEMARK OFFICE
CERTIFICATE OF CORRECTION

PATENT NO.    : 6,243,220 B1  
DATED         : June 5, 2001  
INVENTOR(S)   : Akio Aoki et al.

Page 1 of 1

It is certified that error appears in the above-identified patent and that said Letters Patent is hereby corrected as shown below:

Title page,  
Insert:  
-- [*] Notice: This patent issued on a continued prosecution application filed under 37 CFR 1.53(d). and is subject to the twenty year patent term provisions of 35 U.S.C. 154(a)(2) --.

Column 9,  
Line 16, "performs" should read -- perform --;  
Line 17, "the" should be deleted; and  
Line 49, "is" should read -- are --.

Column 10,  
Line 1, "is" should read -- are --.

Signed and Sealed this

Twenty-eighth Day of May, 2002

*Attest:*

*Attesting Officer*

JAMES E. ROGAN  
*Director of the United States Patent and Trademark Office*